US010552131B2

(12) United States Patent
Dang et al.

(10) Patent No.: US 10,552,131 B2
(45) Date of Patent: Feb. 4, 2020

(54) BARRIER REDUCTION DURING CODE TRANSLATION

(71) Applicant: Microsoft Technology Licensing, LLC, Redmond, WA (US)

(72) Inventors: Clarence Siu Yeen Dang, Newcastle, WA (US); Arun Upadhyaya Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/784,299

(22) Filed: Oct. 16, 2017

(65) Prior Publication Data

US 2019/0114173 A1 Apr. 18, 2019

(51) Int. Cl.
*G06F 8/52* (2018.01)
*G06F 9/30* (2018.01)

(52) U.S. Cl.
CPC ............ *G06F 8/52* (2013.01); *G06F 9/30105* (2013.01); *G06F 9/30145* (2013.01); *G06F 9/30174* (2013.01); *G06F 9/30181* (2013.01)

(58) Field of Classification Search
CPC .... G06F 9/30181; G06F 8/52; G06F 9/30174; G06F 9/30105; G06F 9/30145
USPC ........................................................ 712/202
See application file for complete search history.

(56) References Cited

U.S. PATENT DOCUMENTS

| 5,822,778 | A | * | 10/1998 | Dutton ................. G06F 9/30116 711/208 |
| 6,681,385 | B1 | * | 1/2004 | Steensgaard .............. G06F 8/75 707/999.202 |
| 2010/0211762 | A1 | * | 8/2010 | Saha .................... G06F 9/30065 712/205 |
| 2016/0216967 | A1 | | 7/2016 | Dixon et al. |

OTHER PUBLICATIONS

Lustig, et al., "ArMOR: Defending Against Memory Consistency Model Mismatches in Heterogeneous Architectures", In Proceedings of the 42nd Annual International Symposium on Computer Architecture, Jun. 13, 2015, pp. 388-400.
"International Search Report and Written Opinion Issued in PCT Application No. PCT/US18/054902", dated Jan. 21, 2019, 12 Pages.

(Continued)

*Primary Examiner* — Benjamin P Geib
*Assistant Examiner* — Shawn Doman
(74) *Attorney, Agent, or Firm* — Workman Nydegger

(57) ABSTRACT

Reducing emission of barriered instructions when translating processor instructions between instruction set architectures (ISA's). Embodiments include obtaining block(s) of processor instructions formatted according to a first processor ISA. The block(s) include an instruction that performs a memory operation whose execution order is constrained based on a hardware memory model of the first processor ISA. Based on an analysis of the block(s) of processor instructions, it is determined that the memory operation of the at least one instruction can be made order-independent in a hardware memory model of a second processor ISA. Based on the determination, one or more unbarriered processor instructions that are formatted according to the second (Continued)

processor ISA are emitted. The unbarriered processor instruction(s) are structured to perform the memory operation without ordering constraint.

20 Claims, 6 Drawing Sheets

(56) References Cited

OTHER PUBLICATIONS

Wikipedia, "Escape Analysis—Wikipedia, the Free Encyclopedia", accessed Oct. 17, 2017, 4 pages, Available at URL: https://en.wikipedia.org/wiki/Escape_analysis.

Wikipedia, "Java Performance—Wikipedia, the Free Encyclopeida", accessed Oct. 17, 2017, 11 pages, Available at URL:https://en.wikipedia.org/wiki/Java_performance#Escape_analysis_and_lock_coarsening.

Choi, Jong-Deok, Manish Gupta, Mauricio Seffano, Vugranam C. Sreedhar, Sam Midkiff, "Escape Analysis for Java", Procedings of ACM SIGPLAN OOPSLA Conference, Nov. 1, 1999, 19 pages, http://www.cc.gatech.edu/~harrold/6340/cs6340_fall2009/Readings/choi99escape.pdf.

"Java on a 1000 Cores—Tales of Hardware / Software CoDesign", accessed Oct. 17, 2017, 2 pages, Available at URL: https://www.youtube.com/watch?v=5uljtqyBLxl.

\* cited by examiner

500

| | x86 Instructions | Stack-Derived Registers (at Instruction Entry) | Simplified ARM Instructions |
|---|---|---|---|
| 1 | push ebp | esp | dmb ishst<br>str wfp,[x28,#-4]! |
| 2 | mov ebp, esp | esp | mov wfp,w28 |
| 3 | sub esp, 0x40 | ebp, esp | subs w28,w28,#0x40 |
| 4 | mov edi, esp | ebp, esp | mov w20,w28 |
| 5 | mov eax, esp | ebp, esp, edi | mov w27,w28 |
| 6 | add eax, 8 | ebp, esp, edi, eax | adds w27,w27,#8 |
| 7 | mov ecx, 10 | ebp, esp, edi, eax | mov w0,#0xa |
| 8 | LoopTop:<br>mov dword ptr[eax], 1 | ebp, esp, edi, eax | LoopTopArm:<br>mov w6,#1<br>dmb ishst<br>str w6,[x27] |
| 9 | add eax, 1048576 | ebp, esp, edi, eax | mov w6,#0<br>movk w6,#0x10,lsl #16<br>adds w27,w27,w6 |
| 10 | mov dword ptr[edi], 2 | ebp, esp, edi | mov w6,#2<br>dmb ishst<br>str w6,[x20] |
| 11 | add edi, 4 | ebp, esp, edi | adds w20,w20,#4 |
| 12 | sub ecx, 1 | ebp, esp, edi | subs w0,w0,#1 |
| 13 | cmp ecx, 0 | ebp, esp, edi | subs w2,w0,#0 |
| 14 | jne LoopTop | ebp, esp, edi | bne LoopTopArm |
| 15 | mov ebx, dword ptr[eax] | ebp, esp, edi | ldr w21,[x27]<br>dmb ishld |
| 16 | mov ecx, dword ptr[edi] | ebp, esp, edi | ldr w0,[x20]<br>dmb ishld |

```
1           LEA EBX, SyncVariable          ; Point to a synchronization variable
2                                          ; shared with another thread
3     LoopTop:
4           CMP ECX, 0
5           JE  LoopExit                   ; Exit if the loop counter reaches 0
6
7           MOV EAX, DWORD PTR [ESI]       ; Load 4 bytes from the source pointer.
8                                          ; ESI is implicitly loop counter-
9                                          ; derived (ESI is advanced at line 43 at the
10                                         ; end of each loop iteration) so barriers can
11                                         ; be omitted.
12
13          SHL EAX, 1                     ; Perform a data manipulation (left-shift)
14                                         ; on the loaded value
15
16
17          MOV EDX, ECX                   ; Compute offset in the destination
18          SHL EDX, 4                     ; buffer = loop counter(ECX) * 16.
19
20          ADD EDX, EDI                   ; Add in the base address of the
21                                         ; destination buffer.
22
23          MOV DWORD PTR [EDX], EAX       ; Store value to the destination
24                                         ; buffer. EDX is explicitly loop
25                                         ; counter derived (through arithmetic
26                                         ; involving ECX), so barriers can be omitted.
27
28          MOV EAX, DWORD PTR [EBX]       ; Access to synchronization variable.
29          CMP EAX, 0                     ; EBX is not stack-derived or loop
30                                         ; counter-derived. Additionally,
31                                         ; the access wasn't using the FS
32                                         ; segment and didn't use a repeated
33                                         ; string instruction.
34                                         ; A barrier should be emitted
35                                         ; to order this read with the below
36                                         ; read of SomeSharedVariable.
37          JE  Continue
38
39          MOV EAX, DWORD PTR [SomeSharedVariable]
40          [...]                          ; Code that does something with EAX
41
42    Continue:
43          ADD ESI, 4                     ; Advance the source buffer pointer
44          SUB ECX, 1                     ; Decrement the loop counter
45          JMP LoopTop
46
47    LoopExit:
```

FIG. 6

BARRIER REDUCTION DURING CODE TRANSLATION

BACKGROUND

Modern microprocessors (processors) employ many techniques to achieve high performance. For example, many modern processors are capable of simultaneously executing a plurality of threads. For instance, a processor may include multiple physical cores, each capable of executing independent threads simultaneously with the other cores. Additionally, or alternatively, a single physical processor core may be capable of simultaneously executing two or more threads. This capability is known as simultaneous multi-threading, or SMT (also referred to as hyper-threading). When SMT is used, each physical core is viewed as including two or more "logical" cores that each executes a different thread using shared execution units (e.g., such as multiple arithmetic logic units). In some implementations in which a processor possesses multiple physical cores, each of these physical cores is also an SMT-capable core. In most of these implementations, the processor therefore presents twice the number of logical cores as there are physical cores.

Another technique used to achieve high performance is for a core to execute individual hardware code instructions in an order other than the order in which they were written or, more typically, than the order in which they were generated by a compiler. Such "out of order" execution enables the core to more fully utilize its internal processor resources (e.g., execution units), which are often highly parallelized. For example, if two (or more) hardware instructions are not dependent on each other, a single processor core may be able to execute these instructions in parallel, rather than idly waiting for one instruction to complete prior to beginning execution of another. Out-of-order execution can be applied to many types of hardware instructions, including instructions that perform memory operations (i.e., operations that read from or write to a memory hierarchy, typically including one or more caches and system memory). Due to out-of-order execution and/or memory hierarchy design, memory accessing operations may be perceived by another core or device as occurring in a different order than that prescribed in the original code.

In many cases, multiple threads simultaneously executing at one or more cores are related, such as being part of the same application process. When simultaneously executing threads are related, the hardware instructions executing for one thread may perform memory operations that affect one or more of the other threads, by accessing (i.e., reading from and/or writing to) a memory location in the memory hierarchy that is being used by one or more of the other threads. For example, a thread may access a shared variable (e.g., a global variable), a data structure that is shared by the threads, etc. If memory operations from different threads are executed out-of-order at their respective cores (physical or logical), and/or executed out-of-order by the memory hierarchy, this out-of-order execution could lead to problems if it is not properly dealt with.

For example, a process may include multiple threads that synchronize via one or more synchronization variables. To illustrate, suppose that code for a first thread sets two data variables and a synchronization variable, whose value starts as FALSE. For example:
Data1=A
Data2=B
SyncVariable=TRUE Suppose further that code for a second thread reads the values of Data1 and Data2, but only when SyncVariable is TRUE. For example:
Temp=SyncVariable
WHILE Temp=FALSE
// Do something that does not involve data A or B
END WHILE
Read A & B For correct execution, some ordering constraints in this scenario include both (i) the write to SyncVariable by the first thread must be ordered after the writes by the first thread to Data1 and Data2, and (ii) the read of SyncVariable by the second thread must be ordered before subsequent reads of Data1 and Data2 by the second thread.

To address memory operation re-ordering concerns, modern processors employ hardware memory models that define how memory effects are globally visible in a multi-processor (including multi-core) system. In particular, hardware memory models define how threads can interact through memory, including how they can use shared data such as synchronization variables. Programming languages can further employ software memory models to apply additional restrictions at compile time. In general, a hardware memory model defines what types of out-of-order execution of memory operations are possible when executing multiple threads.

Some processors have hardware memory models that tend to apply many restrictions to out-of-order execution of memory operations, and are thus referred to as having a generally "stronger" memory model. Other processors have hardware memory models tend to apply fewer restrictions to out-of-order execution of memory operations, and are thus referred to as having a generally "weaker" memory model. Memory models can therefore fall on a spectrum from the strongest (e.g., a "sequentially consistent" memory model with no memory reordering) to the weakest (e.g., in which any load or store operation can effectively be reordered with any other load or store operation, as long as it would not modify the behavior of a single, isolated thread).

To illustrate, the x86 family of processor instruction set architectures (ISA's) (e.g., x86, x86-64, referred to herein as x86) are known generally as having a relatively strong memory model, in which machine instructions usually come implicitly with acquire and release semantics. As a result, for most x86 instructions, when one core performs a sequence of writes, every other core generally sees those values change in the same order that they were written. In general, an instruction has "acquire semantics" if other cores will always see its memory effect before any subsequent instruction's memory effect, and an instruction has "release semantics" if other cores will see every preceding instruction's memory effect before the memory effect of the instruction itself. By contrast, the ARM-compatible family of processor ISA's are known generally as having a relatively weak or "relaxed" memory model compared to x86 ISA's, and permit many types of memory operation reordering so long as address dependencies are preserved.

Frequently, it may be desirable to execute an application that was compiled for processors having a first ISA (e.g., x86) on a processor having a second ISA (e.g., ARM). If the application's higher-level source code is available, and it was written in a portable manner, it is usually relatively straightforward to re-compile the application with the second ISA as the target. If source code is not available, however, the hardware instructions (i.e., assembly code) of the application's executable binary need to be translated to instructions of the second ISA. Thus, a translator may translate the first hardware instructions of the first ISA to compatible second hardware instructions of the second ISA.

If the first ISA has a stronger memory model than the memory model of the second ISA, any of the first hardware instructions that access memory may carry implicit acquire and release semantics. Since these semantics are implicit, it is generally not known from the instructions, themselves, what types of required orderings exist. Thus, when emitting second instructions for the second ISA, conventional translators typically insert memory barriers into the second instructions to force the memory operations to execute with ordering restrictions that are similar to those that would have existed in the first ISA. A memory barrier may comprise one or more additional instructions that are emitted in connection with an instruction that performs a memory operation, and that apply ordering constraints to execution of the memory operation. Additionally, or alternately, a memory barrier may comprise an instruction in the second ISA that performs the memory operation while enforcing ordering constraints itself Since the translator is operating based on implicit acquire and release semantics of individual instructions, rather than a broader understanding of the application code that may be possible if higher-level source code was available, there may be many situations in which it emits barriers that are not actually necessary for correct execution of the application at the second ISA, and that may not have been created had the higher-level source code been compiled with the second ISA as a direct target. As such, these barriers enforce unnecessary ordering constraints for correct execution at the second ISA, generally increase the number of instructions emitted in the second ISA, and harm execution performance of the translated application at the second ISA.

BRIEF SUMMARY

At least some embodiments described herein reduce the number of "barriered" instructions that are emitted during code translation from a first ISA to a second ISA. The embodiments herein may be particularly helpful if the hardware memory model of the first ISA is stronger than the hardware memory model of the second ISA. Thus, the embodiments herein may benefit translation of assembly code from a stronger memory model (e.g. x86, AMD64, and SPARC TSO) to assembly code for a weaker memory model (e.g. ARM, PowerPC, and Alpha).

In some embodiments, a method for reducing emission of barriered instructions when translating processor instructions between instruction set architectures (ISA's) includes obtaining one or more blocks of processor instructions formatted according to a first processor ISA. The one or more blocks of processor instructions include at least one instruction that performs a memory operation whose execution order is constrained based on a hardware memory model of the first processor ISA. Based on an analysis of the one or more blocks of processor instructions, it is determined that the memory operation of the at least one instruction can be made order-independent in a hardware memory model of a second processor ISA. Based on this determination, one or more unbarriered processor instructions are emitted. These unbarriered processor instructions are formatted according to the second processor ISA, and are structured to perform the memory operation without ordering constraint.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates example of translation of x86 code instructions to corresponding ARM code instructions, based on register classifications; and FIG. 6 illustrates x86 machine code demonstrating loop counter-derived memory accesses.

DETAILED DESCRIPTION

Figure 1:
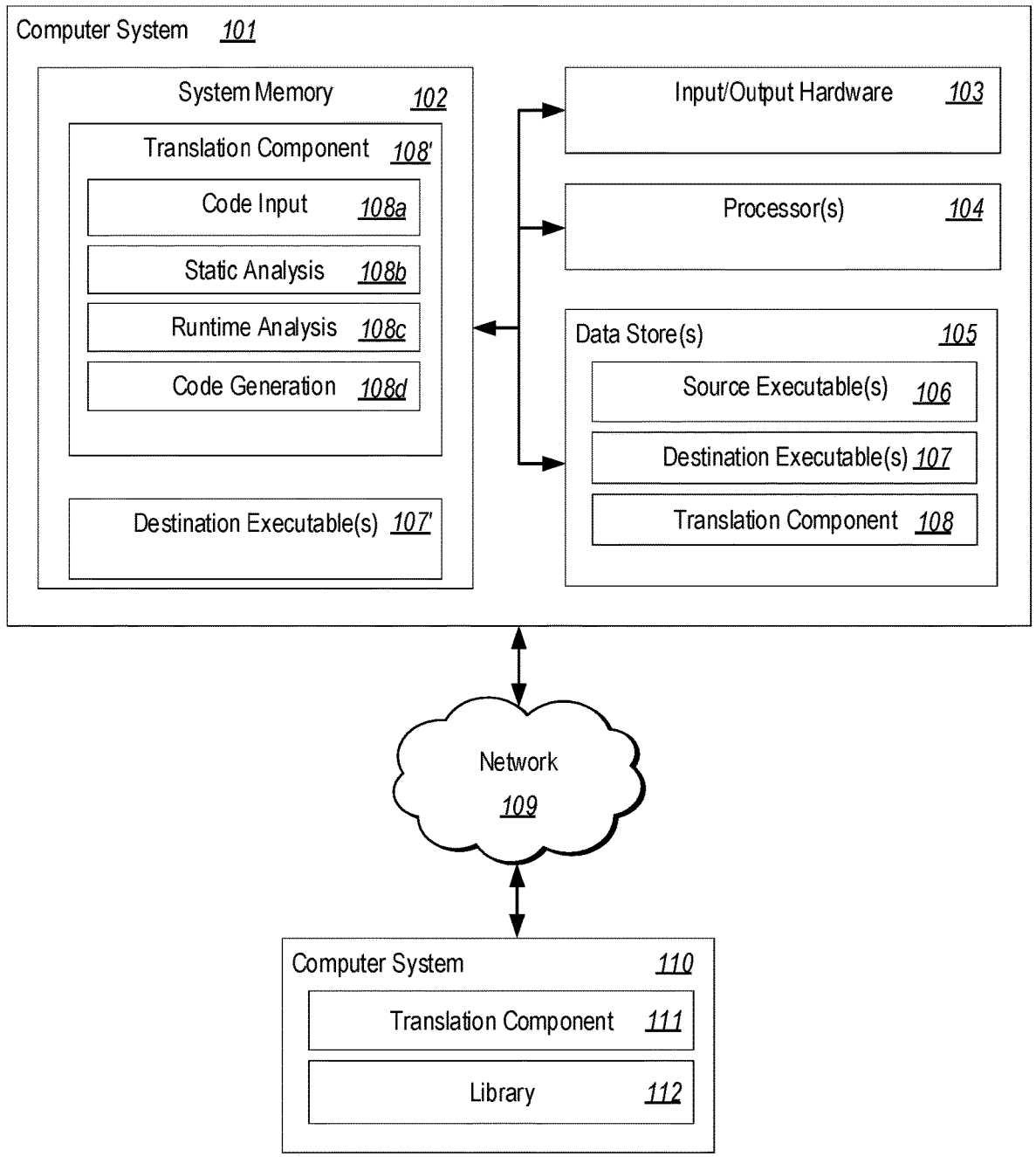
FIG. 1 illustrates an example computer architecture that facilitates barrier reduction during code translation.

At least some embodiments described herein reduce the number of "barriered" instructions that are emitted during code translation from a first ISA to a second ISA. The embodiments herein may be particularly helpful if the hardware memory model of the first ISA is stronger than the hardware memory model of the second ISA. Thus, the embodiments herein may benefit translation of assembly code from a stronger memory model (e.g. x86, AMD64, and SPARC TSO) to assembly code for a weaker memory model (e.g. ARM, PowerPC, and Alpha).

Reducing the number of "barriered" instructions that are emitted into the second ISA can reduce the overall size of the code that is emitted, but more importantly it can significantly increase the execution performance of the emitted code. For example, the inventors have frequently observed that in ARM assembly, emitting unbarriered ARM instructions for memory accesses results in a significant improvement in execution speed of the memory accesses versus barriered ARM instructions. As will be defined more particularly hereinafter an "unbarriered" instruction can include one or more instructions that omit a memory barrier, while a "barriered" instruction can include one or more instructions that include a memory barrier.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of this context, FIG. 1 illustrates an example computer architecture 100 that facilitates barrier reduction during code translation. Referring to FIG. 1, computer architecture 100 includes a computer system 101, which is configured to reduce emission of barriered instructions when translating processor instructions between ISA's. As shown, computer system 101 includes system memory, input/output hardware 103, processor(s) 104, and data store(s) 105. Stored in data store(s) 105 are source executable(s) 106. Source executable(s) 106 comprise executable binaries that are formatted according to a first processor ISA other than a second processor ISA of the processor(s) 104 of computer system 101. For example, the source executable(s) 106 could include one or more streams of hardware processor instructions formatted according to the first ISA. In order to be able to execute source executable(s) 106 using processor(s) 104, the data store(s) 105 include a translation component 108, such as operating system library, an emulation application, etc.

The translation component 108 is shown as being loaded into system memory 102 (i.e., translation component 108'). The computer system 101 could load the translation component 108' as a result of invocation of an operating system library, as a result of opening of an emulation application, etc. In some embodiments, the translation component 108' is loaded on-demand upon receipt of a request to execute the source executable(s) 106.

As shown, the translation component 108' includes a plurality of sub-components, which symbolically represent various functionality that might be part of the translation component 108'. For example, the translation component 108' is shown as including a code input component 108a, a static analysis component 108b, a runtime analysis component 108c, and a code generation component 108d. However, one of skill in the art will recognize, in view of the disclosure herein, that this functionality is merely illustrative and non-limiting.

In some embodiments, the code input component 108a obtains all, or a portion, of the source executable(s) 106 from the data store(s) 105. The code input component 108a provides the hardware processor instructions of the source executable(s) 106 to one or both of the static analysis component 108b and/or the runtime analysis component 108c. In some embodiments, the code input component 108a divides the hardware processor instructions into blocks of one or more instructions in the first ISA, and the static analysis component 108b and/or the runtime analysis component 108c perform their respective analysis on each of these blocks.

In some embodiments, a block comprises one code entry-point and one or more code exit points. However, embodiments could support multiple entry-points, or could restrict the number of exit points to one (which is commonly described by those of skill in the art as a "basic block"). A block may additionally, or alternatively, be identified based on data size (e.g., a specified number of bytes). For example, the code input component 108a could attempt to identify a basic block, but if one is not identified within a predefined number of bytes then the block may be cut off at the specified number of bytes rather than continuing to identify the end of the basic block.

In some embodiments, a block of instructions need not include a contiguous set of instructions. For example, if the instructions include an unconditional jump instruction (i.e., that unconditionally jumps over one or more instructions), the code input component 108a might skip the jumped-over instructions when forming a block. Thus, the block could include the unconditional jump and (potentially) the instruction that was jumped to, but lack the one or more instructions that were jumped over.

Some of these blocks of instructions may include one or more instructions that perform memory operations. Thus, upon receipt of a set of instruction(s), the static analysis component 108b and/or the runtime analysis component 108c perform one or more types of analysis to identify any instructions in the set that perform memory access operations. When there are, the static analysis component 108b and/or the runtime analysis component 108c can further determine if any of these memory access operations would not need to be ordered in the second ISA of the processor(s) 104, even though they might have ordering constraints in the first ISA. The one or more types of analysis might also identify instruction(s) in the set that perform memory access operations that would need to be ordered in the second ISA of the processor(s) 104. It may also be that there are memory access operations for which no determination as to orderability in the second ISA is made. The results of the analysis by the static analysis component 108b and/or the runtime analysis component 108c are then passed to the code generation component 108d. The types of analysis used can vary, and several examples are described hereinafter in connection with FIGS. 3-6.

The code generation component 108d translates the set of instruction(s) into corresponding instruction(s) formatted according to the second ISA, so that they can be executed at the processor(s) 104. As part of translation, the code generation component 108d uses the analysis results received from the static analysis component 108b and/or the runtime analysis component 108c to generate/emit "unbarriered" processor instruction(s) in the second ISA that perform any memory access operations that were identified as not needing to be ordered in the second ISA. Otherwise, the code generation component 108d generates/emits "barriered" processor instruction(s) in the second ISA that perform any memory access operation(s) that were identified as needing to be ordered in the second ISA. The code generation component 108d may also generate/emit "barriered" processor instruction(s) in the second ISA for any other memory access operation(s) (i.e., ones for which the analysis made no determination as to orderability in the second ISA).

As used in this description and in the claims, an "unbarriered" processor instruction is one that imposes no ordering constraints on the memory operation(s) defined by the instruction. A "barriered" processor instruction, on the other hand, is either (i) one or more instruction(s) that do impose an ordering constraint on the memory operation(s) defined by the instruction, or (ii) a plurality of instructions including one or more first instructions that imposes no ordering constraints on the memory operation(s) defined by the instruction(s), along with one or more second instructions that cause an ordering constraint on the first instruction(s). The second instruction(s) can comprise one or more "memory barrier" instructions, which are also referred to by those skilled in the art as "memory fence" instructions. Many processor architectures define memory barrier/fence instructions, and the code generation component 108d can choose an appropriate instruction that is available in the second ISA. Note that the one or more first instructions and the one or more second instructions may be emitted in different orders, depending on the second ISA (for example, the one or more second instructions may be emitted prior to the one or more first instructions).

It will be appreciated that some processor architectures may offer a variety of processor instructions that perform memory operations, and may include ordering-constrained and ordering-unconstrained variations of the same type of operation. Thus, when emitting an unbarriered processor instruction the code generation component 108d could choose the unconstrained variation, and when emitting a barriered processor instruction the code generation component 108d could choose the constrained version. If the processor architecture lacks such variations (e.g. only has the unconstrained types), then when emitting a barriered processor instruction the code generation component 108d could emit the available unconstrained type, along with an additional barrier instruction.

Output of the translation component 108' can include destination executable(s) 107 (including both executable binaries, libraries, etc.) that comprise hardware processor instructions that are defined according to the second ISA of the processor(s) 104. In addition, executable(s) can comprise in-memory buffer(s) that contain executable code, potentially along with some metadata that may not be directly executable. These executable(s) could be stored only in system memory 102, or (as depicted) could be committed to data store(s) 105 for persistent storage. These destination executable(s) 107 can also be executed at the processor(s) 104, as indicated by the destination executable(s) 107' resident in system memory 102.

As shown, some embodiments may leverage another computer system 110, which could be separated by one or more network(s) 109 (e.g., an LAN or a WAN, including the Internet). As shown, computer system 110 could include a translation component 111 that is also configured to translate machine instructions from one processor ISA to another, while reducing the use of barriers. It could also include a library 112, such as a library of different translated executables. Thus, for example, computer system 110 could operate as a remote translation service, which performs all, or part, of the work of translation component 108.

The particular timing of code translation by the translation component 108 and/or 111 and execution of destination executable(s) 107 can vary based on implementation, and based on design factors such as user experience, performance, and power usage goals. It will be appreciated by those of skill in the art that the translation of source executable(s) 106 to destination executable(s) 107 can consume a considerable amount of resources (e.g., system memory 102 and/or processor(s) 104). Thus, computing environment 100 can be configured in a variety of ways to balance different implementation goals.

For example, in one embodiment source executables(s) 106 (or portions thereof) are submitted to computer system 110, which performs one or more of the functions of translation component 108 (e.g., a static analysis and code generation) using translation component 111. The results of this work are then made available in the library 112. For example, upon installation of source executable(s) 106, upon initial execution of source executable(s) 106, or at some other time (e.g., on a predefined or periodic schedule) computer system 101 could identify source executable(s) 106 to computer system 110 (e.g., based on a code signature, hash, developer identifier, etc.). If computer system 110 has already processed the source executable(s) 106, it can return destination executables 107 from library 112. Otherwise, computer system 101 might submit the source executable(s) 106 (or portions thereof) to computer system 110, which could then translate them with the translation component 111 and makes translated code available in library 112. Use of computer system 110 in this manner has the advantage of minimizing the amount of processing/power usage at computer 101, while still providing computer system 101 with optimized (i.e., code with reduced barrier usage) destination executable(s) 107. Since computer system 110 may have more processing capability than computer system 101, it may be able to perform more types of analysis and/or more complex heuristics as part of the analysis than may be possible or practical at computer system 101, resulting in highly optimized destination executable(s) 107. As an alternative, computer system 101 might initially translate source executables(s) 106 itself (though generating suboptimal translated code due to performing fewer or less complicated types of analysis than the computer system 110 might perform), and also submit the source executables(s) 106 to computer system 110 for a more thorough analysis and more optimized code translation than was performed at computer system 101.

In another embodiment, all work is performed at computer system 101. For example, upon installation of source executable(s) 106, upon initial execution of source executable(s) 106, or at some other time (e.g., on a predefined or periodic schedule) computer system 101 can determine whether destination executables(s) 107 exist. If they do, they can be executed at the processor(s) 104. Otherwise, translation component 108 can be invoked to generate destination executable(s) 107.

In some embodiments, the translation component 108 generates destination executable(s) 107 based entirely on a static analysis (i.e., using static analysis component 108b). Thus, the translation component 108 generates destination executable(s) 107, and then executes them at the processor(s) 104 only after the translation is completed. A static analysis has the advantage of potentially being able to perform a larger number of types of analysis and/or more complex heuristics are part of the analysis than a runtime analysis (i.e., using runtime analysis component 108c), potentially resulting in more optimized destination executable(s) 107 than if a runtime analysis were used exclusively. Additionally, computer system 101 may be able to choose a time to perform the translation when computer system 101 is attached to an external power supply, and/or when the processor(s) 104 are largely idle.

In some embodiments, the translation component 108 generates destination executable(s) 107 based entirely on a runtime analysis. Thus, the processor(s) 104 execute portions of destination executable(s) 107 as they are generated by the code generation component 108d. In this embodiment, the code input 108a determines which portion(s) of hardware processor instructions of the source executable(s) 106 will be (or will likely be) executed next, and passes those instructions(s) to the runtime analysis component 108c for analysis and translation by the code generation component 108d. In some embodiments, when the code input 108a identifies blocks of instructions, the code generation component 108d generates instructions formatted according to the second ISA (using the analysis by the runtime analysis component) for that block and passes a block of translated instructions to the processor(s) 104 for execution. A runtime analysis has the advantage of enabling source executable(s) 106 to be translated and executed "on demand," without causing a significant delay to beginning execution as might be the case with static analysis. In addition, a runtime analysis may be able to make optimizations based on observed runtime behavior, such as determining which pieces of code are more heavily utilized and in what way, and target optimizations based on this information.

Combinations of static and runtime analysis are also possible. For example, a runtime analysis can be performed on code blocks that the processor(s) 104 are waiting to execute, or are anticipated to execute in the immediate or near future. Then, if there is a reduced period of activity at the processor(s) 104, a static analysis can be performed on other code blocks that are anticipated to execute in the less immediate or near future. Thus, for example, upon a request to launch the source executable(s) 106 runtime analysis can be utilized to facilitate a responsive launching and initial use of the application. Then, when there is available time on the processor(s) 104, the remaining portions of the source executable(s) 106 can be translated based on static analysis. Additionally, portions that were translated using runtime analysis may be re-translated later using static analysis, which may be able to produce more optimized translated code than the runtime analysis. This has the advantage of providing responsiveness, while still gaining the advantages of static analysis (e.g., a more in-depth analysis than may be possible with a runtime analysis alone).

Some implementations may even combine runtime analysis at computer system 101 with static analysis at computer system 110. For example, computer system 101 could use runtime analysis to provide responsive launching and initial use of an application corresponding to source executable(s) 106. Then, while executing the application using runtime analysis, computer system 101 could request a static analysis of one or more portions of the source executable(s) 106 from computer system 110.

Figure 2:
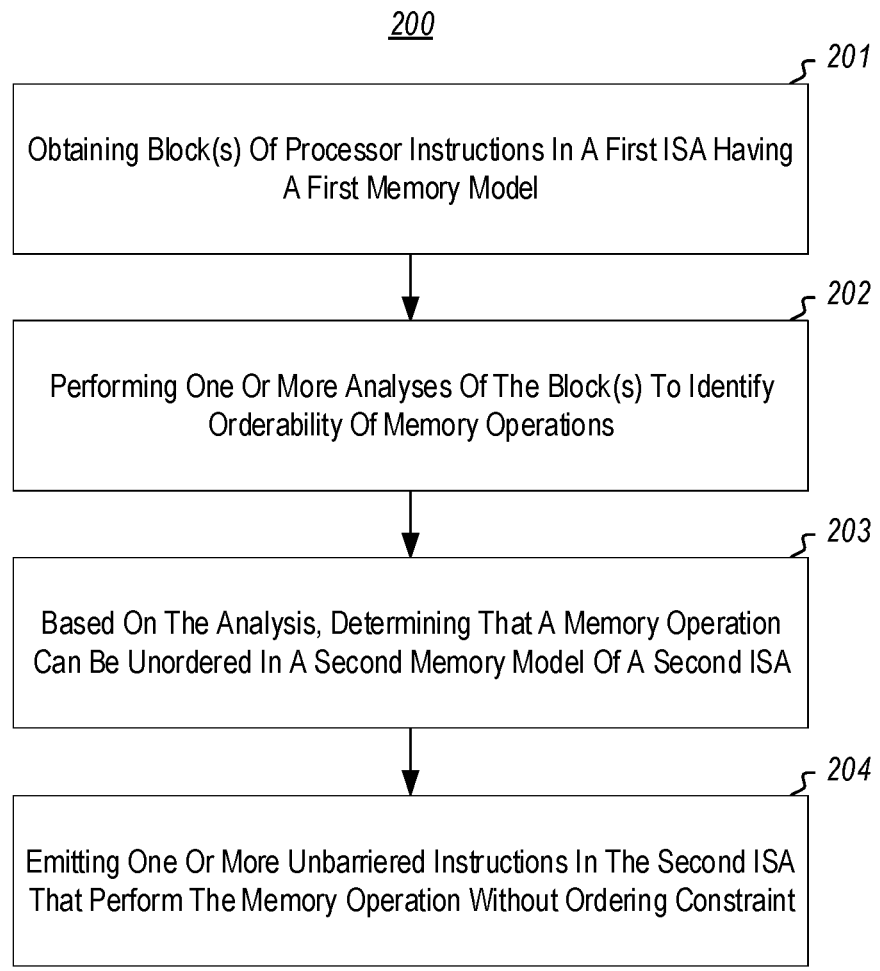
FIG. 2 illustrates a flow chart of an example method for reducing emission of barriered instructions when translating processor instructions between ISA's.

In view of the computing environment 100 of FIG. 1, FIG. 2 illustrates a flow chart of an example method 200 for reducing emission of barriered instructions when translating processor instructions between ISA's. While method 200 is depicted as a series of acts, it will be appreciated that these are examples only, and that methodologies for reducing emission of barriered instructions when translating processor instructions between ISA's, consistent with the disclosure herein, could include variations on these acts.

As shown, method 200 comprises an act of 201 of obtaining block(s) of processor instructions in a first ISA having a first memory model. In some embodiments, act 201 can include obtaining one or more blocks of processor instructions formatted according to a first processor ISA, the one or more blocks of processor instructions including at least one instruction that performs a memory operation whose execution order is constrained based on a hardware memory model of the first processor ISA. For example, if method 200 is being performed at computer system 101, the code input component 108a can obtain the source executable(s) 106, and identify one or more blocks of processor instructions in those executable(s). Similarly, if the method 200 is being performed at computer system 110, a corresponding code input component at the translation component 111 can obtain source executable(s) 106 (e.g., its own local storage, or from computer system 101) and identify one or more blocks of processor instructions in those executable(s).

Method 200 also comprises an act 202 of performing one or more analyses of the block(s) to identify orderability of memory operations. In some embodiments, act 202 can include performing one or more types of analysis on the one or more blocks of processor instructions to determine orderability of one or more memory operations performed by the one or more blocks of processor instructions. For example, if the method 200 is being performed at computer system 101, one or both of the static analysis component 108b and/or the runtime analysis component 108c can perform one or more analyses on the one or more blocks of processor instructions. Similarly, if the method 200 is being performed at computer system 110, a corresponding analysis component(s) at the translation component 111 can perform one or more analyses on the instructions. Particular examples of some possible analyses are described hereinafter.

Method 200 also comprises an act of 203 of, based on the analysis, determining that a memory operation can be unordered in a second memory model of a second ISA. In some embodiments, act 203 can include, based on an analysis of the one or more blocks of processor instructions, determining that the memory operation of the at least one instruction can be made order-independent in a hardware memory model of a second processor ISA. For example, even though a memory operation may be ordered in the first ISA the analysis may determine that it can actually be unordered in the second ISA. This may be, for example, because the second ISA has a weaker memory model than the first ISA, and/or because analysis determined that the memory operation operates on data other than synchronization variables (e.g., thread-local data or plain data, as discussed below).

Method 200 also comprises an act of 204 of emitting one or more unbarriered instructions in the second ISA that perform the memory operation without ordering constraint. In some embodiments, act 204 can include, based on the determination, emitting one or more unbarriered processor instructions, formatted according to the second processor ISA, that are structured to perform the memory operation without ordering constraint. For example, the computer system could choose from among available operations one or more versions that are not ordering constrained (rather than constrained versions), or could choose to omit a memory barrier or fence that would normally be emitted absent the analysis.

In contrast, method 200 could also include determining that another memory operation of another instruction in the one or more blocks of processor instructions cannot be made order-independent in the hardware memory model of a second processor ISA, and emitting one or more barriered processor instructions, formatted according to the second processor ISA, that are structured to perform the other memory operation with ordering constraint. In this instance, the computer system could choose from among available operations one or more versions that are ordering constrained (rather than unconstrained versions), or could choose to emit a memory barrier or fence (e.g., in connection with one or more normally unconstrained operations).

Notably, while these acts can be performed at a single computer system, they could alternatively be performed across more than one computer system (e.g., computer system 101 and computer system 110). For example, as discussed above, computer system 101 could submit executables and/or code blocks to computer system 110 for analysis, and it could perform one or more of the above acts while the others are performed at computer system 101.

As mentioned, various types of types of analysis may be used as part of a static and/or runtime analysis. In general, these analyses can be divided into two categories—those that determine if a memory access is to thread-local data, and those that determine if a memory access is to plain data (i.e., a data structures or variables other than synchronization variables). There are various heuristics that are possible under each category.

Analyses for Identifying Accesses to Thread-Local Data

One family of heuristics is based on the observation by the inventors that memory accesses to a thread's local data need not be ordered across threads or processors. As such, various heuristics can be used to determine if a memory access is to thread-local data.

Stack Memory Locations

A thread's stack memory is normally not shared with any other thread. Thus, the inventors have recognized that memory operations that access the current thread's stack memory will be local to that thread, and do not normally need to be ordered across threads or processors. Thus, embodiments include one or more heuristics that determine if a memory operation comprises a thread-local memory access to a thread's stack memory.

Figure 3:
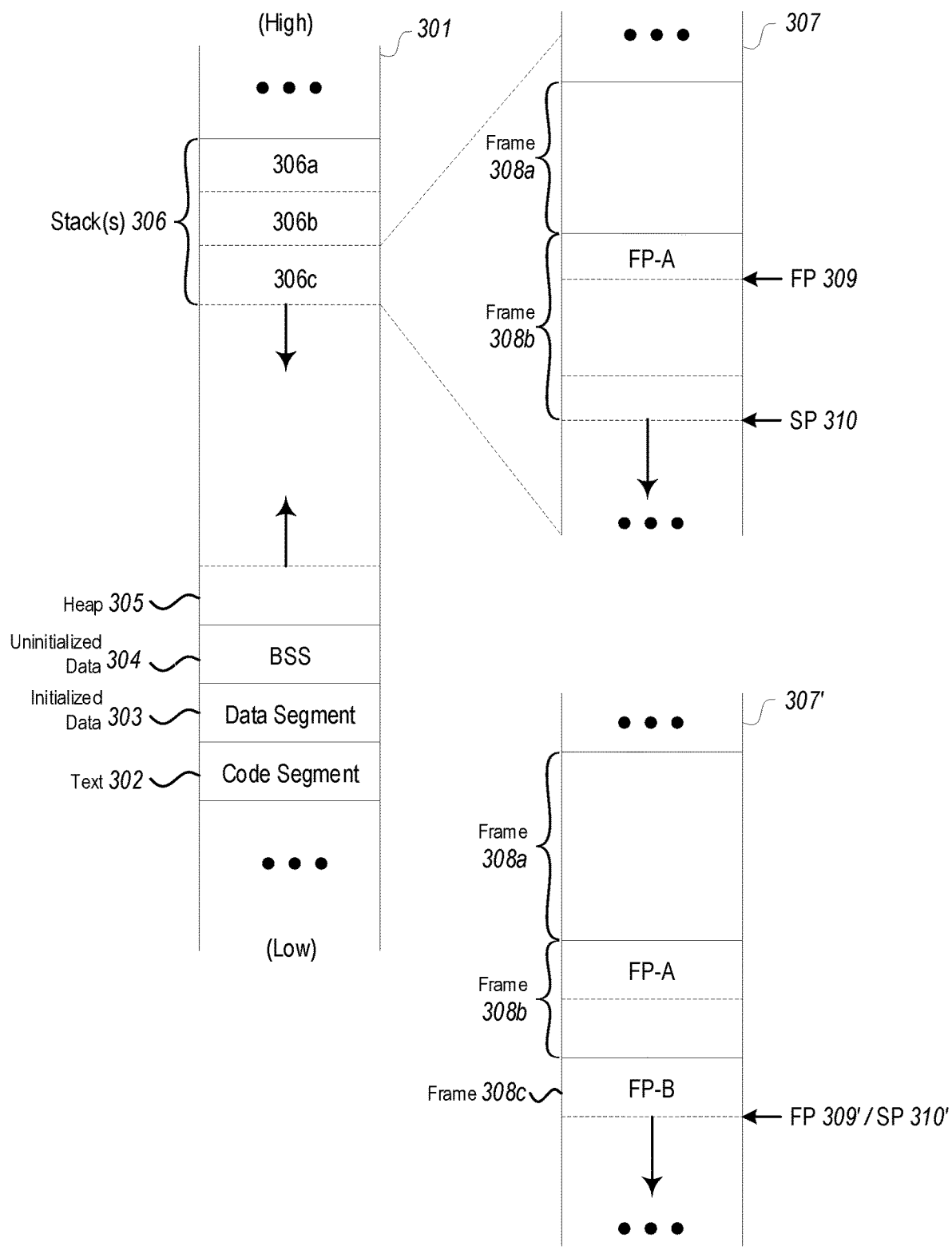
FIG. 3 illustrates an example memory layout which may be used by embodiments herein.

As a preliminary matter, and to facilitate an understanding of these concepts, FIG. 3 illustrates an example memory layout 300, which corresponds generally to a possible memory layout of processes compiled for the x86 architecture. It will be appreciated that memory layout 300 is one example only, and can vary depending on processor ISA, operating system, and/or programming language. Thus, other memory layouts may place different data segments in different locations, include additional data segments, omit some of the shown data segments, etc.

Initially, memory layout 300 shows a virtual layout 301 that illustrates an overall view of a process' memory space. One of skill in the art will recognize that virtual layout 301 does not typically correspond to the actual physical layout of available memory (e.g., system memory 102), but rather represents a virtual view of memory that is presented to a process by an operating system (e.g., through virtual memory management techniques). As shown, virtual layout 301 includes memory addresses that range from "low" addresses (e.g., starting at 0x00000000 in a 32-bit system) to "high" addresses (e.g., ending at 0xffffffff in a 32-bit systems, which would total 4GiB of virtually-addressable memory).

Starting at the low addresses, virtual layout 301 includes a text segment 302, which is also commonly referred to as a "code segment." The text segment 302 typically stores the actual code of the process to which virtual layout 301 corresponds—i.e., the hardware processor instructions of the program that are executed to form the process' thread(s). Next, virtual layout 301 includes an initialized data segment 303, which is also commonly referred to as a "data segment." The initialized data segment 303 typically stores global and static variables, as initialized in program code. Next, comes an uninitialized data segment 304, which is commonly referred to as a BSS (or "block initialized by segment"). The uninitialized data segment 304 typically stores global variables and static variables that are initialized to zero, or do not have explicit initialization in source code. Embodiments herein consider the initialized data segment 303 and/or the uninitialized data segment 304 to generally comprise memory shared by threads.

Following the uninitialized data segment 303 is a dynamically-resizable segment called a heap 305. As shown, in virtual layout 301 the heap 305 begins at the end of the uninitialized data segment 304, and grows towards larger addresses. The heap 305 is where thread(s) in the process can dynamically allocate storage space. Thus, embodiments herein may consider the heap 305 to generally comprise memory shared by threads.

After a section of unallocated memory comes another dynamically-resizable segment called a stack segment 306, which can include one or more stacks—each corresponding to a different thread in the process. Thus, if the process is single-threaded, the stack segment 306 would typically contain a single stack. The depicted stack segment 306 includes three stacks (306a, 306b, and 306c), indicating that the process includes three threads. A stack is a last-in-first-out (LIFO) structure where dynamically-allocated variables are stored, along with other information that is saved each time a function is called. As shown, in virtual layout 301 the stack segment 306 (and each individual stack) grows through the unallocated memory to smaller addresses towards the heap 305. When the stack segment 306 includes multiple stacks, each individual stack is generally allocated a defined block of memory (e.g., typically on the order of single-digit megabyte blocks, such as 1MiB in WINDOWS, or 8MiB in LINUX).

Memory layout 300 also includes a memory segment 307 that represents a simplified overview of a stack 306c. As shown, stack 306c includes a plurality of stack frames (308a and 308b). A new stack frame is added to the stack each time an instance of a function is called, and is removed when the instance completes. In general, a function "pushes" new values onto its stack frame, and "pops" values off when they are no longer needed. Thus, a function's stack frame can dynamically grow and shrink as its corresponding function executes. When a function completes, its entire stack frame is "popped" from the stack, and the prior stack frame becomes active. In order to facilitate this, prior to calling a function, the calling function typically places onto its stack frame a return address (i.e., where to return to when function corresponding to the frame completes), and certain environmental information such as some of the processor register values for the caller.

While (for simplicity) FIG. 3 omits some elements typical of a stack, FIG. 3 does show some of the elements used to identify the current stack frame, and which are particularly relevant for identifying memory accesses to thread-local memory. Initially, most processors include a "frame pointer" register that stores the memory address of the base of the current stack frame (and is generally referred to as "pointing" to the base of the current stack frame). In the x86 ISA, for example, this is the Extended Base Pointer (EBP) register. Thus, FIG. 3 shows a frame pointer (FP) 309 that stores the memory address corresponding to the first entry of frame 308b. As shown, this entry also stores the base address of the prior frame 308a (i.e., the "FP-A" notation within the entry). A newly called function typically allocates room on the stack for its local variables following this base entry. Thus, these local variables are often referenced in machine code using an offset from the FP 309 (e.g., EBP minus some integer in the x86 ISA, where the stack typically grows to smaller addresses).

In addition, most processors also include a "stack pointer" register that points to the "top" of the current stack frame. In the x86 ISA, for example, this is the Extended Stack Pointer (ESP) register. Thus, FIG. 3 shows a stack pointer (SP) 310 that stores the memory address corresponding to the last entry of the frame 308b (e.g. the last address into which data was "pushed" onto the stack). Locations on the stack are often referenced in machine code using an offset from the SP 310 (e.g., ESP plus some integer in the x86 ISA, where the stack typically grows to smaller addresses).

Memory segment 307' illustrates what happens to the FP 309 and the SP 310 when a function is called. In particular, memory segment 307' includes a new stack frame 308c corresponding to the function. The first entry of stack frame 308c (which may be one entry after the prior entry to which the SP 310 pointed) stores the base address of the prior stack frame (i.e. FP-B). The new stack pointer (as indicated with SP 310') and new frame pointer (as indicated with FP 309') are both updated with the address of this first entry. Thus, in the x86 ISA, a common machine instruction pattern for creating a new stack frame is:

PUSH EBP
MOV EBP, ESP

In this "function prologue", the "PUSH EBP" instruction places the value of the FP 309 (EBP) into the stack entry after the one pointed to by the SP 310 (ESP), and updates the stack pointer SP 310' (ESP) to point to this new entry. The "MOV EBP, ESP" instruction places the value of the new SP 310' (ESP) into the new FP 309' (EBP). From here, the newly called function would typically "push" its local variables and other data onto the stack, causing the SP 310' to diverge from the FP 309' (e.g., as was the case in stack frame 308b of memory segment 307.)

In some embodiments, a memory operation is determined to access stack memory if it uses a value from a register that is identified by the heuristics as being "stack-derived." For example, in some circumstances a memory address is likely to be on a thread's stack if it is obtained from a stack pointer register 310 and/or a frame pointer register 309. Thus, in many circumstances, one or both of these registers can be considered to be stack-derived. This is particularly true immediately following a function prologue, as described below. Registers that obtained their values based on a stack-derived register may also be classified as stack-derived. Embodiments may employ data flow analysis techniques to track data as it flows through various registers, to determine if each register remains stack-derived at each step.

Figure 4:
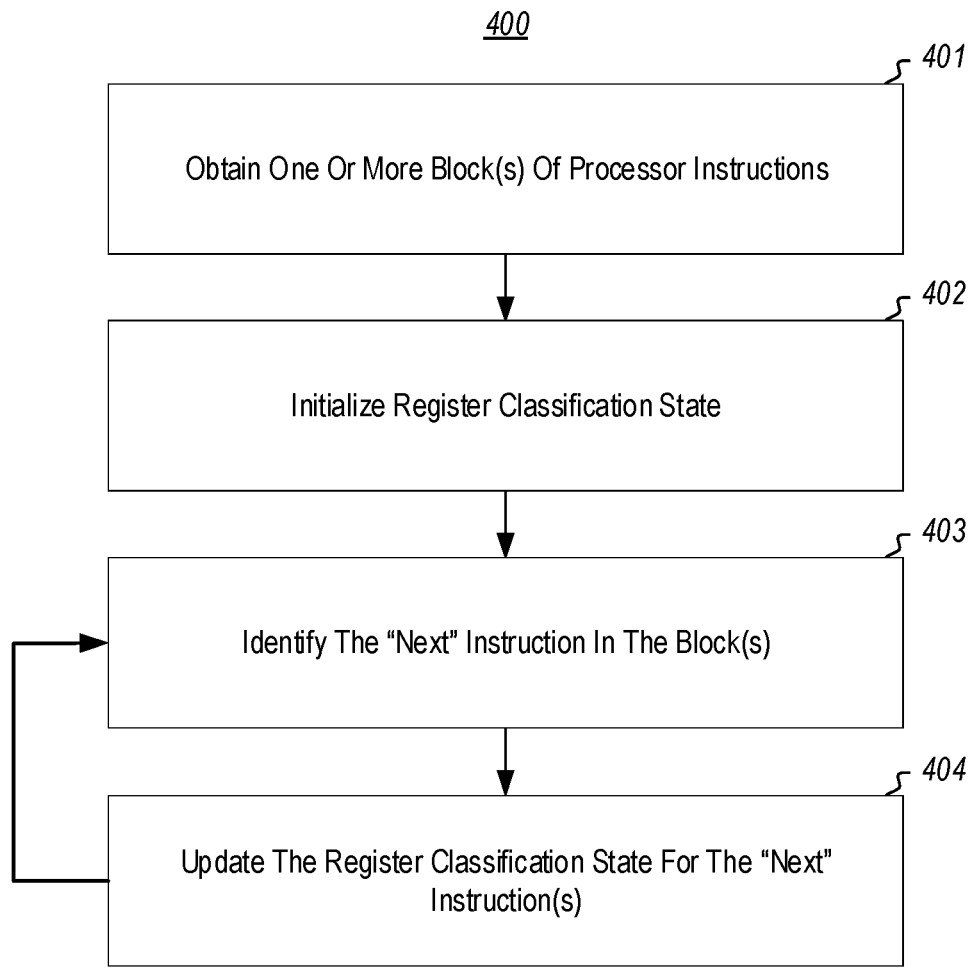
FIG. 4 illustrates a flow chart of an example method for classifying registers as either "stack-derived" or "global"

Detailed heuristics are given later for determining if a register is stack-derived. However, as a general outline, FIG. 4 illustrates an example of method 400 for classifying registers as either "stack-derived" (i.e., their values are thread-local, so any memory access based on their values may be unordered) or "global" (i.e., their values are not known to be thread-local, so any memory access based on their values may be ordered) including tracking the flow of data. This method 400 could be performed, for example, by the static analysis component 108*b* and/or the runtime analysis component 108*c* as part of act 202 of method 200. In general, the method 400 maintains data identifying which general-purpose processor registers (e.g., EAX, EBX, ECX, EDX, EDI, ESI, ESP, EBP, etc. in x86) are stack-derived or global. While non-general-purpose registers (e.g., those found in x86 extensions such as X87, MMX, SSE, AVX, etc.) could also be tracked, they do not generally contain pointers, and thus doing so may introduce unnecessary overhead.

Method 400 operates on one or more blocks, such as those identified by the code input component 108*a* in act 201 of method 200. Thus, as shown, method 400 starts by obtaining one or more block(s) of processor instructions (act 401). Then, method 400 initializes register classification state (act 402). For example, a conservative implementation may initialize each tracked register as being "global." However, as an exception, a more aggressive implementation act 402 may initialize the stack pointer register 310 to a stack-derived state, rather than a global state. Other even more aggressive implementations, which trade added performance for a greater risk of execution correctness problems, could omit tracking classifications of the stack pointer register 310 altogether (i.e., always considering it to be stack-derived). Yet other implementations may track classifications for the stack pointer register 310, but emit unbarriered instruction(s) for accesses that rely directly on the stack pointer register 310, even if it is classified as global.

Next, at act 403, method 400 identifies the "next" instruction(s) in the block. This "next" instruction may be analyzed immediately or placed in a queue of instructions. If this is the first iteration of act 403 (and no instructions have been analyzed yet), it will typically select an instruction at one of the entry point(s) of the block. Otherwise, the identity of the "next" instruction may vary based on the prior instruction. If the prior instruction was not a branch instruction (e.g., "MOV EAX, 1" in x86) then the "next" instruction may be defined as the instruction that appears after the prior instruction in the instruction stream contained in the block(s). If the prior instruction was an unconditional branch instruction (e.g. "JMP 0x1234" in x86), then the "next" instruction may be defined as the instruction at the target of the branch (e.g. the instruction at address 0x1234). If the prior instruction is a conditional branch instruction (e.g. "JE 0x1234" in x86), then there may be two "next" instructions: the instruction at the target of the branch (e.g. the instruction at 0x1234), and the instruction that appears after the prior instruction in the instruction stream. In some embodiments, if more than one instruction is identified, act 403 may select one of them, and queue the other for later analysis; however, act 403 could also queue both instructions.

At act 404, method 400 updates the register classifications for the "next" instruction(s) identified in act 403. In particular, act 404 takes the register classifications for the current instruction (or the initial classifications made in act 402, if the "next" instruction is the first instruction being analyzed—e.g., a block's entry point), and based on those classifications determines how to transform the classification of each register (if necessary) at entry of each "next" instruction. Act 404 may apply one or more of a variety of heuristics when determining how to transform register classifications for entry to an instruction. These are discussed in more detail later, but in some embodiments, act 404 usually determines that a register becomes stack-derived if (a) execution of the instruction would likely result in the register containing a pointer to the stack, and that the pointer to the stack is unlikely to have "escaped" the thread. Conversely, act 404 may determine that a register becomes global if (b) execution of the instruction would likely result in anything other than (a).

In some implementations, method 400 maintains register classification data for each instruction in the block, such as a separate array structure or list for each instruction. Thus, in these implementations, act 404 may take as input an array or list generated by analysis of the prior instruction, and produce as output a transformed array or list based on execution of the current instruction.

As shown, acts 403 and 404 may repeat until there are no more "next" instructions to consider. Note that, depending on the aggressiveness of the analysis, some instructions in the block may be analyzed more than once. For example, if the block contains a loop, the instructions in the loop may be considered multiple times. The method 400 may determine when to stop analyzing the loop based on such things as the loop naturally completing, performing a defined number of iterations of the loop, the register classification state reaching a steady state as the loop iterates, and the like.

For example, when performing a subsequent analysis of an instruction as part of a loop, act 404 may examine whether already defined register classifications for the instruction are the same as the incoming classifications from the prior instruction (e.g., if a previously-generated array associated with the instruction is the same as the output array generated by the analysis of the prior instruction). If they are the same, this branch of the analysis may terminate. If they are different, the instruction's classifications may be merged with the incoming classifications. For example, if arrays per instruction are used, and if a register is classified global in either instruction's array, the register is adjusted to be classified as global in the current instruction's array; otherwise the register in the current instruction's array remains classified as stack-derived.

As mentioned, there are a variety of heuristics that could be performed in act 404. The particular heuristics to used may vary based on whether method 400 is being performed by the static analysis component 108*b* or the runtime analysis component 108*c* (i.e., a static analysis may perform greater number and/or a greater complexity of heuristics than a runtime analysis), based on a current load at the processor(s), based on a current energy availability at the computer system 101 (e.g., remaining battery capacity, energy draw rates, availability of power, etc.), and the like.

Some implementations include one or more heuristics that are designed to answer the question of: given a register whose state is stack-derived or global, is a value derived from that register also stack-derived? Different heuristics can answer that question based on how that value is derived from the register. Thus, following are some example heuristics that can be used to answer this question. These examples are not considered exhaustive and since these are heuristics, alternative implementations could make different decisions based on different justifications than those given.

First heuristics may apply the same classification to the value as the register from which it is taken. Thus, if a register is stack-derived, these heuristics may also consider the value of the register to be stack-derived. In some implementations, this may mean that (i) a memory access to the address in the register is likely stack-derived and the instruction likely does not require ordering. To illustrate, the x86 instruction "MOV [ECX], EAX" (which places the value stored in the EAX register into the memory location stored in the ECX register) may not require ordering if the ECX register is already classified as stack-derived. Similarly, if ECX were global, then the memory access would be global (and would warrant ordering). This may also mean that (ii) an instruction that copies a stack-derived register to a destination register causes the destination register to also become stack-derived. To illustrate, the x86 instruction "MOV EDX, ECX" (which places the value stored in the ECX register into the EDX register) causes EDX to become stack-derived if the ECX register is already classified as stack-derived. Similarly, if ECX were global, then the EDX would also become global.

Second heuristics may classify a register as global if it is set to a constant value. Thus, regardless of whether a register is stack-derived or global, if it is assigned a new constant value, these heuristics may mark it as global. For example, the x86 instruction "MOV ECX, 0xABADCAFE" (which places the constant value 0xABADCAFE into the ECX register) would make ECX global using these heuristics. This is because it is likely not known if that constant value corresponds to a stack memory location or not. An alternative implementation, however, could determine whether the constant value points to the stack and if so, mark the register as stack-derived.

Third heuristics might classify a value as stack-derived if it is the result of adding a global value (e.g., a value from a register classified as global) to a stack-derived value (e.g., a value from a register classified as stack-derived). These heuristics are built upon an observation that if a program adds a global value to a stack-derived value, it is likely adding a pointer offset to a stack-derived value to generate a stack-derived value. For example, if one register is global and another is stack-derived, then using these heuristics (i) a memory access to the address that is the sum of the two registers is likely to a stack-derived value. For example, the x86 instruction "MOV [ESI+ECX], EAX" (which places the value stored in the EAX register into the memory location that is addressed by the sum of the values in the ESI and ECX registers) would likely be using a stack-derived value for the memory address if ESI is global and ECX is stack-derived (or vice versa). In addition, using these heuristics (ii) an instruction that adds the two registers causes the destination register to become stack-derived. For example, the x86 instruction "ADD ESI, ECX", which adds the values in the ESI and ECX registers and places the sum in the ESI register causes the ESI to become stack-derived if ESI is global and ECX is stack-derived (or vice versa). Some generalized guidelines for applying these heuristics when adding or subtracting the values of registers are summarized in Table 1.

TABLE 1

| First Reg. | Second Reg. | Result | Justification |
|---|---|---|---|
| Stack-derived | Stack-derived | Global Value | It's generally unlikely that adding two pointers to the stack would result in a pointer to the stack. |
| Stack-derived | Global | Stack-derived Value | If it is assumed that the global value is a pointer offset that is not too large, then the result would continue to point to the stack. |
| Global | Stack-derived | Stack-derived Value | Similar to the previous row. |
| Global | Global | Global Value | If neither value points to the stack, there is generally no reason to presume that a pointer to the stack will result from the calculation. |

Fourth heuristics may conclude that if a "relatively small" constant is added or subtracted to or from a stack-derived value, the result would most likely still be stack-derived. For example, if a register is stack-derived then using these heuristics (i) a memory access to the address stored in register, plus a relatively small constant (e.g., 4), would likely be stack-derived. For example, the x86 instruction "MOV [ECX+4], EAX" (which places the value stored in the EAX register into the memory location obtained by adding 4 to the value of the ECX register) is likely using an address on the stack if ECX is already stack-derived. Additionally, if a register is stack-derived then using these heuristics (ii) an instruction that adds a relatively small constant (e.g., 4) to the register would keep the register stack-derived. For example, the x86 instructions "ADD ECX, 4" (which adds 4 to the value of ECX, and stores the result in ECX) or "LEA ECX, [ECX+4]" (which does the same but does not update the flags register, EFLAGS) would both leave ECX as stack-derived if it was previously stack-derived.

However, as mentioned, a stack is of limited size, so the result of adding or subtracting a large constant to a stack-derived value would be unlikely to still point to the stack. As such, embodiments may apply some threshold size at which the constant is no longer considered "relatively small." The particular threshold used can vary depending on implementation, but as an example, this threshold could be some fraction of the usual stack size limit (e.g., if a stack is usually limited to up to 1MiB, this threshold could perhaps be defined as 2^14 (16KiB)). Some generalized guidelines for adding or subtracting small constants to the values of registers are summarized in Table 2.

TABLE 2

| Reg. Value | Constant | Result |
|---|---|---|
| Stack-Derived | Small | Stack-derived |
| Stack-Derived | Large | Global |
| Global | Doesn't Matter | Global |

Fifth heuristics may update a classification based on bitwise operations on a stack-derived value. For example, if an instruction modifies the "low" bits of a value, it has a similar effect to adding or subtracting a small value. The definition of "low" can vary based on implementation. Some implementations may match it to the threshold constant value that is used to define "relatively small." Thus, as an example only, if that threshold were to be 2^14 (as above), the definition of "low" bits could match threshold by defining "low" as the lower 14 bits of a value. As an example, Table 3 outlines some possible results of bitwise operations on registers REG1 and REG2, assuming REG1 is classified as stack-derived and REG2 is classified as global prior to each operation.

TABLE 3

| Operation | Example Instruction | Result |
|---|---|---|
| OR'ing only low bits of a stack-derived value | OR REG1, 3 | Stack-derived |
| OR'ing any high bits of a stack-derived value | OR REG1, 0x80000000 | Global |
| OR'ing any bits of a global value | OR REG2, 3 | Global |
| XOR'ing bits of a value | XOR REG1, 3 XOR REG2, 3 | Analysis is the same as OR |
| AND'ing to manipulate only the low bits of a stack-derived value | AND REG1, 0xFFFFFF00 | Stack-derived |
| AND'ing to manipulate any high bits of a stack-derived value | AND REG1, 0 | Global |
| AND'ing to manipulate any bits of a global value | AND REG2, 3 | Global |

Sixth heuristics may classify a register as global if its value is destructively changed. For example, if an operation changes a stack-derived register in a drastic way, and nothing is known about the value being placed in the register, some embodiments classify the register as global. Table 4 illustrates some non-limiting examples using x86 instructions and registers for clarity.

TABLE 4

| Operation | Example x86 Instruction | Notes |
|---|---|---|
| Multiplication by an integer other than 1 | MUL ECX, 2 | ECX becomes global |
| Shifting or rotating by a nonzero amount | SHL EAX, 2 SHR EAX, 2 ROR EAX, 2 | EAX becomes global |
| Shifting or rotating by a variable amount | SHL EAX, CL SHR EAX, CL ROR EAX, CL | EAX becomes global: Note that this may not have to happen if CL contains 0 and the implementation checked for that |
| Load flags into part of EAX | LAHF | EAX becomes global: Flags values are unlikely to contribute to a memory address |
| Calling a function | CALL Function | In some environments, after the CALL instruction returns, registers that are considered volatile in the function calling convention (e.g. EAX, ECX, and ECX) would have changed and should be considered global. Non-volatile stack-derived registers are unchanged and remain stack-derived. |
| Running a loop | LOOP Label | ECX becomes global: LOOP defines ECX as a loop counter and therefore it is unlikely to be a pointer to the stack |
| Writing CPU information into EAX, EBX, ECX, EDX | CPUID | EAX, EBX, ECX, EDX become global |
| Moving floating point or SIMD data into a general purpose register | MOVD EAX, XMM0 | The general purpose register (EAX here) becomes global |
| Converting a floating point number to an integer and storing it in a general purpose register | CVTSS2SI EAX, XMM0 | The general purpose register (EAX here) becomes global |

Regardless of whether a register is global or stack-derived, seventh heuristics may classify a register as global if a value from memory is loaded into the register. For example, for the x86 instruction "MOV ECX, [EAX]" (which places the value from the memory location addressed by the value of EAX into ECX) these heuristics may make ECX global, regardless of whether EAX is stack-derived or global. This is because it is not generally known if a value stored at a memory location (even if that memory location is on the stack) corresponds to a stack-based memory address. However, similar to the second heuristics (i.e., setting a register to a constant value), implementations could determine whether the value stored at the memory location points to the stack and if so, mark the register (e.g., ECX in the example above) as stack-derived.

Eighth heuristics may set all register classifications to global if a stack-derived value is stored in a global address. This is because it is possible that a pointer to the stack is being published (i.e., shared with another thread). This is how a pointer to the stack may have "escaped" a thread, as could be determined in act 404 above. When a pointer to the stack escapes a thread, all future accesses to the stack may require synchronization for correct execution. As a result, these heuristics classify all registers as global when this happens. To further illustrate these concepts, Table 5 presents an analysis of a sequence of x86 instructions, assuming that ECX and ESP start as stack-derived, and ESI is global.

TABLE 5

| Instruction | Analysis |
|---|---|
| MOV [ESP], ESI | This is a memory access to the stack, so ordering can be omitted for this instruction. The instruction writes a global value (from ESI) to memory, and register states can remain unchanged. |
| MOV [ESP], ECX | This is another memory access to the stack, so ordering can also be omitted for this instruction. The instruction writes a stack-derived value (a pointer to the stack) to stack memory. Since the pointer hasn't "leaked" to another thread, register states can remain unchanged. |
| MOV [ESI], ESP | This is a memory access to global memory, so the instruction is orderable. The instruction writes a pointer to the stack (i.e., the value of the stack pointer) to global memory. Since this pointer can leak to another thread, ESP and ECX become global. |
| MOV [ESP], ECX | This is a memory access to the stack, but ESP is now global so this instruction should be ordered. The instruction writes a global value (the value of ECX) to memory, so register states can remain unchanged. |

Ninth heuristics may consider operations that act on less than an entire register (i.e., sub-register operations). For example, the x86 instructions "ADD CH, 4" or "ADD CL, 4" manipulate only parts of the ECX register). When sub-register operations occur, the heuristic could take a couple of approaches. A conservative approach could mark the register being operated on as global (i.e., e.g., the ECX register becomes global when the foregoing operations are performed). An alternative approach could treat the operation as adding or subtracting a relatively small constant (similar to the fourth heuristics) or as bitwise operations on "low" values (similar to the fifth heuristics). Thus, for example, depending on thresholds used, the "ADD CH, 4" instruction might modify some "high" bits (similar to being above a threshold in the fourth and fifth heuristics), so this heuristic may transition ECX to global. However, the "ADD CL, 4" might modify only "low" bits, so if ECX were previously stack-derived, the heuristic may permit it to remain stack-derived.

Finally, a tenth heuristic detects function prologues. Due to previously-described heuristics and/or at the beginning of a block, all registers may be considered global (e.g., because they were initialized to global in act 402, or they were classified as global by one or more other heuristics). In these situations, there needs to be one or more heuristics that can transition a register to stack-derived or there will be no opportunity to omit memory ordering (i.e., choose to emit unbarriered instructions). Therefore, these tenth heuristics to transition a stack pointer register 310 to stack-derived if part of a likely function prologue (described above in connection with FIG. 3) and/or local variable allocations are observed.

For example, if in x86 code the sequence of "PUSH EBP" and "MOV EBP, ESP" is observed (i.e., the function prologue) it is generally safe to classify EBP (the frame pointer register 309) and ESP (the stack pointer register 310) as stack-derived. More particularly, before the PUSH instruction it is generally safe to classify ESP as stack-derived, and after the MOV instruction it is generally safe to classify EBP as stack-derived as well. Alternatively, or in addition, if a small non-zero number is subtracted from the stack pointer register 310 (e.g., "SUB ESP, 0x10" in x86), it may be safe to classify the stack pointer register 310 (e.g., ESP) as stack-derived since this instruction is likely allocating space on the stack for local variables.

The foregoing heuristics are usable to identify whether a register (or value) is stack derived or global, which information is then usable by the code generation component 108*d* to generate new code instructions in a different processor ISA, including emitting unbarriered instructions when ordering is not needed (e.g., because the operations operate on registers or values that have been classified as stack-derived and are thus thread-local), or barriered instructions when ordering is still needed (e.g., because the operations operate on registers or values that are classified as global, and are thus are not known to be thread-local).

In order to facilitate a further understanding of how this operates, FIG. 5 illustrates an example of translation of x86 code instructions to corresponding ARM code instructions, based on register classifications using process 400 of FIG. 4, and on some of the heuristics described above. The ARM instructions are labeled as "simplified" since they omit some calculations (e.g., EFLAGS) that are not necessary to understanding of the invention.

Initially, rows 1 and 2 of the x86 instructions correspond to a typical x86 function prologue, and thus ESP is classified as a stack-derived register at the entrypoint of the PUSH instruction and EBP is classified as a stack-derived register after the MOV instruction (i.e., per the tenth heuristic). Additionally, row 3 allocates room on the stack for local variables (i.e., subtracting a small value from ESP), further evidencing that this is the beginning of a function. The PUSH operation in row 1 is a memory access (i.e., placing the value of EBP on the stack). However, since ESP is classified as a stack-derived register, the code generation component 108*d* can emit an unbarriered ARM instruction (i.e., "str wfp,[x28,#-4]!"). As shown, the code generation component 108*d* could have emitted a barrier "dmb ishst" (or something similar) if the PUSH instruction was orderable, but has been able to omit it due to the register classifications.

The register classifications next change due to row 4, where the value of ESP is placed in EDI. Since ESP was stack-derived and EDI now has its value, EDI can now be classified as stack-derived at the entrypoint of the instruction in row 5 (i.e., per the first heuristic).

EAX also becomes stack-derived due to row 5 for the same reasons. At row 6, the constant 8 is then added to the value of EAX, and the result is stored in EAX. Since EAX was already stack-derived, and since it is a small constant that is being added to it, it remains stack-derived (i.e., per the fourth heuristic).

At row 7 the constant 10 is placed in ECX. It was previously marked global, but regardless it remains global since it is being set to a constant value (per the second heuristic).

Row 8 includes a label (LoopTop) that will be used for a jump instruction later (row 14). Its move instruction places the value of 1 into the memory location stored in EAX. This does not, itself, change the state of EAX, and some implementations could treat it as stack-derived for a first iteration of the loop. However, it will become global due to row 9 (per the fourth heuristic where a large constant is added to its value), and remains global for later iterations of the loop. Thus, a conservative approach may mark it as global during all iterations of the loop. As such, it is shown as being struck-out in the list of stack-derived registers at row 8 and row 9. Since EAX is global, the code generation component 108*d* emits barriered ARM instructions to perform the memory operation (i.e., instructions including the barrier "dmb ishst"). Alternatively, unbarriered ARM instructions could be emitted for the first instance of row 8, and barriered instructions could be emitted for subsequent instances.

At row 10, the value of 2 is placed into the location stored in EDI. This does not affect its classification. Since EDI was stack-derived prior to the loop, and only a small constant (4) is being added each time in row 11, EDI can remain stack-derived throughout the loop (per the fourth heuristic). As such, the code generation component 108*d* emits unbarriered ARM instructions (i.e., lacking the "dmb ishst" barrier).

In row 12 the constant 1 is subtracted from ECX, in row 13 its value is compared to zero, and in row 14 execution jumps to LoopTop (row 8) if the compare was not equal to zero. ECX was global prior to these instructions, and remains such.

After the loop, in row 15, the value of the memory location pointed to by EAX is placed in EBX. EAX became global due to line 9, so the code generation component 108*d* can emit barriered ARM instructions (i.e., including the "dmb ishld" barrier). Since EBX is receiving a value from memory, it remains global (per heuristic 7).

Finally, in row 16, the value of the memory location pointed to by EDI is placed in ECX. Since EDI remains stack-derived after the loop, it is accessing stack memory, and the code generation component 108*d* can emit unbarriered ARM instructions (i.e., excluding the "dmb ishld" barrier). Since ECX is receiving a value from memory, it remains global (per heuristic 7).

Other Thread-Local Accesses

Some architectures and/or operating systems may provide other mechanisms that can be used to determine that a memory access is to data that is local to the thread. Any such mechanisms fall within the scope of the present invention, any accesses to thread-local memory locations can be generated as unbarriered instructions.

For example, the WINDOWS operating system executing on x86 processors creates a per-thread thread information block (TIB), which is also referred to as the thread environment block (TEB). The TIB contains information about the thread, including a section of thread-local storage. Since any of the memory locations in a thread's TIB are unlikely to be shared with another thread, accesses to a thread's TIB can be generally be considered thread-local, and accesses to those memory locations can be generated as unbarriered instructions. Data in thread's TIB is typically accessed based on an offset to an x86 segment register (e.g., as referred to by the FS segment override prefix in 32-bit processors, or GS in 64-bit processors). For example, an x86 instruction for accessing a thread's TIB may look something like:

MOV EAX, DWORD PTR FS:[0x24]

Analyses for Identifying Accesses to Plain Data

A program may not rely on the relative ordering of memory accesses to plain data. For example, it may not rely on whether the first pixel in an off-screen buffer was written to before, or after, the second pixel. Instead, it would typically rely on the relative ordering of accesses to synchronization variables such as a Boolean (e.g., "FinishedWritingPixels") stored in the heap 305, initialized data segment 303, etc., and accesses to non-synchronization variables, such as plain data (e.g. those pixels). Thus, another family of heuristics is based on the observation by the inventors that some accesses to some non-thread-local data (e.g., data structures on the heap 305, video memory, etc.) can also be treated as unordered. In particular, some data access patterns can signal that a thread is accessing plain data other than synchronization variables. While two examples are given below, any mechanisms for identifying access to plain data fall within the scope of the present invention, any such accesses to plain data might be able to be generated as unbarriered instructions.

Repeated String Operations

For example, it may be possible to generate unbarriered instructions for string operations that are explicitly marked as repeating. Some ISA's contain instructions for manipulating strings or other buffers, and these instructions can be the basis for identifying plain data and generating unbarriered instructions. The x86 architecture is now used to illustrate these concepts, though the principles may be applicable to other ISA's as well.

The x86 "MOVSD" instruction copies 4-bytes pointed to by the ESI register to the memory location pointed to by the EDI register. It then adds 4 to ESI and 4 to EDI. Now, suppose an x86 program contained five back-to-back MOVSD instructions:

MOVSD
MOVSD
MOVSD
MOVSD
MOVSD

The x86 ISA makes this simpler by defining a "REP" prefix to signal such repeated operations. Thus, it is possible to re-express these instructions using a "REP" prefix, which conceptually runs the MOVSD instruction in a loop. The ECX register specifies the number of times the loop executes. As such, the five MOVSD instructions could be expressed as:

MOV ECX, 5
REP MOVSD

Some implementations would generate unbarriered instructions for each of the 5 loads and each of the 5 stores performed by "REP MOVSD". This is because, if the program is using repeated string operations, it is likely copying plain data (e.g. to implement the C "memcpy" function). Thus, it is unlikely that some of the data would include synchronization variables.

The x86 ISA features an optimization for REP—called fast string operations—where the individual stores are explicitly unordered. If a programmer using fast string operations assumes that repeated stores are unordered, they are probably also assuming that repeated loads are unordered as well and would not be relying on the loads for synchronization. Thus, memory operations related to fast string operations may also be treated as unordered.

Loop Counter-Derived Memory Accesses (i.e., Large Data Buffers)

In addition, it may be possible to detect loops that iterate through a large data buffer. If these loops are detected, some embodiments assume that individual accesses to the buffer need not be ordered relative to one another. Such a buffer could be pixels in an image, audio data, a string, or any other data that does not contain synchronization values.

For example, FIG. 6 shows some commented x86 code where, for each 4-byte value (e.g., line 43) in a buffer pointed to by ESI (e.g., line 7), the code manipulates the loaded value (e.g., line 13), and writes the new value into a buffer pointed to by EDI (e.g., line 20). ECX contains a loop counter (e.g., lines 4, 17, and 44). If this loop were to execute a threshold number of times to be defined as "large" (e.g., 1000 times), it may be reasonable to infer that the loop is manipulating a large data buffer. For example, it would be unlikely that the loop is manipulating an array of data structures, where each data structure contains at least one synchronization variable. It is also unlikely that the loop would be implementing lock-free programming logic with another thread on a thousand synchronization variables.

Thus, if a loop executes a large number of times, loop counter-derived accesses (e.g., lines 7 and 23) are most likely to be accesses to a data buffer, and unbarriered instructions may be able to be emitted for these operations in some embodiments. In contrast, if an instruction accesses addresses that are not loop-counter derived—even if it executes a number of times that is equal to, or proportional, to the number of loop iterations—the instruction is unlikely to be iterating through a data buffer. Instead, it may be accessing a synchronization variable, and barriered instructions may need to be emitted for these instructions (e.g., line 28) in some embodiments.

Accordingly the embodiments described herein provide various mechanisms to determine if a processor instruction that is ordered in a first ISA can be translated to unbarrriered instructions(s) in a second ISA. This can significantly improve the execution performance of the translated code, and may be able to reduce overall code size.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for reducing emission of barriered instructions when translating processor instructions between instruction set architectures (ISA's), the method comprising:

obtaining one or more blocks of processor instructions formatted according to a first processor ISA, the one or more blocks of processor instructions including at least one instruction that performs a memory operation whose execution order is constrained based on a hardware memory model of the first processor ISA;

based on an analysis of the one or more blocks of processor instructions, determining that the memory operation of the at least one instruction can be made order-independent in a hardware memory model of a second processor ISA, the determining being based on determining that the at least one instruction is part of a data access pattern to non-thread-local data other than a synchronization variable by at least:

determining the at least one instruction corresponds to one or more first instructions that repeatedly load data from a memory buffer or repeatedly store data to the memory buffer; or determining that the at least one instruction corresponds to one or more second instructions, within a loop that executes at least a threshold number of times, that make a loop counter-derived memory access; and based on determining that the memory operation can be made order-independent, emitting one or more unbarriered processor instructions, formatted according to the second processor ISA, that are structured to perform the memory operation without an ordering constraint.

2. The method as recited in claim 1, wherein the ordering constraint comprises a first ordering constraint, the method further comprising:

based on the analysis, determining that another memory operation of another instruction in the one or more blocks of processor instructions cannot be made order-independent in the hardware memory model of a second processor ISA; and based on the determining that another memory operation of another instruction in the one or more blocks of processor instructions cannot be made order-independent in the hardware memory model of the second processor ISA, emitting one or more barriered processor instructions, formatted according to the second processor ISA, that are structured to perform the other memory operation with a second ordering constraint.

3. The method as recited in claim 2, wherein emitting one or more barriered processor instructions comprises emitting one or more first instructions that perform the other memory operation, and one or more second instructions that enforce the second ordering constraint.

4. The method as recited in claim 3, wherein at least one of the second instructions is emitted prior to at least one of the first instructions.

5. The method as recited in claim 1, wherein at least part of the analysis is performed at the computer system.

6. The method as recited in claim 1, wherein at least part of the analysis is performed at another computer system.

7. The method as recited in claim 1, wherein determining that the memory operation of the at least one instruction can be made order-independent in the hardware memory model of a second processor ISA comprises determining that the memory operation accesses thread-local data.

8. The method as recited in claim 7, wherein the memory operation is determined to access thread-local data based on the memory operation using a memory address within a current thread's stack.

9. The method as recited in claim 7, wherein the memory operation is determined to access thread-local data based on the memory operation using a memory address obtained from a stack pointer register or a frame pointer register, or on the memory operation using a value derived from the memory address obtained from the stack pointer register or the frame pointer register.

10. The method as recited in claim 9, wherein the memory operation is determined to use the value derived from the memory address obtained from the stack pointer register or the frame pointer register based on one or more of (i) the value being based on one or more arithmetic or bitwise operations performed on the memory address obtained from the stack pointer register or the frame pointer register, or (ii) the value being based on the memory address or a derivative thereof flowing through one or more processor registers after being obtained from the stack pointer register or the frame pointer register.

11. The method as recited in claim 7, wherein the memory operation is determined to access thread-local data based on based on use of a segment override prefix.

12. A computer system, comprising:
one or more processors; and
one or more hardware storage devices having stored thereon computer-executable instructions that are executable by the one or more processors to cause the computer system to reduce emission of barriered instructions when translating processor instructions between instruction set architectures (ISA's), the computer-executable instructions including instructions that are executable to cause the computer system to perform at least the following:

obtain one or more blocks of processor instructions formatted according to a first processor ISA, the one or more blocks of processor instructions including at least one instruction that performs a memory operation whose execution order is constrained based on a hardware memory model of the first processor ISA;

based on an analysis of the one or more blocks of processor instructions, determine that the memory operation of the at least one instruction can be made order-independent in a hardware memory model of a second processor ISA, the determining being based on determining that the at least one instruction is part of a data access pattern to non-thread-local data other than a synchronization variable by at least:

determining the at least one instruction corresponds to one or more first instructions that repeatedly load data from a memory buffer or repeatedly store data to the memory buffer; or determining that the at least one instruction corresponds to one or more second instructions, within a loop that executes at least a threshold number of times, that make a loop counter-derived memory access; and based on determining that the memory operation can be made order-independent, emit one or more unbarriered processor instructions, formatted according to the second processor ISA, that are structured to perform the memory operation without an ordering constraint.

13. The computer system of claim 12, wherein determining that the memory operation of the at least one instruction can be made order-independent in the hardware memory model of a second processor ISA comprises determining that the memory operation accesses thread-local data.

14. The computer system as recited in claim 13, wherein the memory operation is determined to access thread-local data based on the memory operation using a memory address within a current thread's stack or on the operation using a segment override prefix.

15. The computer system as recited in claim 13, wherein the memory operation is determined to access thread-local data based on the memory operation using a memory address obtained from a stack pointer register or a frame pointer register, or on the memory operation using a value derived from the memory address obtained from the stack pointer register or the frame pointer register.

16. The computer system as recited in claim 12, wherein the ordering constraint comprises a first ordering constraint, and wherein the computer-executable instructions also include instructions that are executable to cause the computer system to:
based on the analysis, determine that another memory operation of another instruction in the one or more blocks of processor instructions cannot be made order-independent in the hardware memory model of a second processor ISA; and
based on the determine that another memory operation of another instruction in the one or more blocks of processor instructions cannot be made order-independent in the hardware memory model of the second processor ISA, emitting one or more barriered processor instructions, formatted according to the second processor ISA, that are structured to perform the other memory operation with a second ordering constraint.

17. The computer system as recited in claim 16, wherein emitting one or more barriered processor instructions comprises emitting one or more first instructions that perform the other memory operation, and one or more second instructions that enforce the second ordering constraint.

18. The computer system as recited in claim 17, wherein at least one of the second instructions is emitted prior to at least one of the first instructions.

19. A computer program product comprising one or more hardware storage devices having stored thereon computer-executable instructions that are executable by athefl one or more processors to cause a computer system to reduce emission of barriered instructions when translating processor instructions between instruction set architectures (ISA's), the computer-executable instructions including instructions that are executable to cause the computer system to perform at least the following:
obtain one or more blocks of processor instructions formatted according to a first processor ISA, the one or more blocks of processor instructions including at least one instruction that performs a memory operation whose execution order is constrained based on a hardware memory model of the first processor ISA;
based on performing one or more types of analysis on the one or more blocks of processor instructions, determine that the memory operation of the at least one instruction can be made order-independent in a hardware memory model of a second processor ISA, the determining being based on determining that the at least one instruction is part of a data access pattern to non-thread-local data other than a synchronization variable by at least:
determining the at least one instruction corresponds to one or more first instructions that repeatedly load data from a memory buffer or repeatedly store data to the memory buffer; or
determining that the at least one instruction corresponds to one or more second instructions, within a loop that executes at least a threshold number of times, that make a loop counter-derived memory access; and
based on determining that the memory operation can be made order-independent, emit one or more unbarriered processor instructions, formatted according to the second processor ISA, that are structured to perform the memory operation without an ordering constraint.

20. The computer program product of claim 19, wherein the one or more types of analysis include a stack-derived register analysis that includes, for the one or more blocks of processor instructions:
initializing register classification state; and
for each instruction in the one or more blocks of processor instructions, updating the register classification state to indicate which register(s) are stack-derived at entry of that instruction.

* * * * *